United States Patent [19]

Kuiken

[11] Patent Number: 5,501,108
[45] Date of Patent: Mar. 26, 1996

[54] TESTING DEVICE FOR WIPPER HOOKS

[75] Inventor: Hendrik Kuiken, Emmeloord, Netherlands

[73] Assignee: Kuiken N.V., Emmeloord, Netherlands

[21] Appl. No.: 290,500

[22] Filed: Aug. 15, 1994

[51] Int. Cl.$^6$ ................................................. G01L 1/00
[52] U.S. Cl. .................................. 73/862.57; 73/432.1
[58] Field of Search ..................... 73/862.03, 862.542, 73/862.56, 862.57, 862.42, 862.393, 862.391, 432.1

[56]    References Cited

U.S. PATENT DOCUMENTS

| | | | |
|---|---|---|---|
| 1,136,511 | 4/1915 | Daimler | 73/862.57 |
| 1,433,067 | 10/1922 | Burr | 73/862.57 |
| 2,079,021 | 5/1937 | Malcolm et al. | 73/862.57 |
| 2,108,433 | 2/1938 | Edwards | 73/862.57 |
| 3,110,176 | 11/1963 | Dreier | 73/862.03 |
| 3,624,783 | 11/1971 | Chang | 214/16 R |
| 4,106,335 | 8/1978 | Shatto | 73/862.57 |
| 4,755,947 | 7/1988 | Braschler et al. | 364/432 |

*Primary Examiner*—Richard Chilcot
*Assistant Examiner*—R. Biegel
*Attorney, Agent, or Firm*—Young & Thompson

[57]    ABSTRACT

Testing device for wipper hooks on vessels. The testing device comprises a pontoon to be positioned against the vessel on which the wipper hooks have to be tested. The pontoon can be displaced relative to the vessel with the help of winches. On the pontoon traction elements are provided to exert a traction force on the wipper hook to be tested. This force is measured by a load cell integrated in the line system connecting the pontoon and the wipper hook during testing.

6 Claims, 4 Drawing Sheets

TESTING DEVICE FOR WIPPER HOOKS

BACKGROUND OF THE INVENTION

The subject invention relates to a testing device for wipper hooks on vessels. Wipper hooks are used on vessels wherein during sailing a load or person has to be moved from one vessel to an adjacent vessel.

For such a transfer a line is provided extending from an eye provided on a mast on one vessel to a corresponding eye on another mast of the other vessel.

It will be clear that such wipper hooks are not only subjected to the weight of the article to be transferred but also subjected to the effect of the waves during such a transport of articles.

Because of that safety standards are set for regularly testing wipper hooks.

In the prior art testing was realized by positioning a lift truck or the like on the quay by the side of which the ship was moored. A line was connected between the wipper hook and the lift truck and a force was exerted to test the wipper hook.

Except from interfering other jobs to be done during mooring of the vessel, such as loading and unloading, and other activities on both the vessel and the quay there is a substantial danger for injuries, for persons, or damage to goods if the wipper hook cannot withstand the traction exerted thereon.

Because of that safety measures have to be taken, for example an area around a testing device had to be cleared.

Because testing is not only realized in the direction perpendicular to the board of the vessel, but also in the direction with an angle thereto, such a safety area had to be relatively large. A further problem encountered was that during testing, the testing device had to be displaced all along the side of the vessel. This means that the safety area had to be constantly changed.

In practice this means that all other activities are normally stopped if testing of the wipper hooks is realized.

SUMMARY OF THE INVENTION

The present invention provides a testing device which is particularly useful for testing wipper hooks. The testing device is specifically designed to test these wipper hooks without interfering any other activities on the vessel and without the danger of injury or damage to persons and articles on the quay where the vessel is moored.

To that end the testing device for wipper hooks on vessels, comprising a vessel, such as a pontoon to be positioned against the vessel on which the wipper hook is provided, said pontoon being provided with traction means connected to a line system, arranged to engage the wipper hook to be tested, wherein the traction means are provided with means to determine the traction force exerted on the wipper hook.

Because the wipper hooks are provided on different levels on masts the invention aims to provide a testing device which can simply be adapted to these several heights.

According to the invention this is realized in that the traction means comprise height adjustable engagement means having line receiving means.

These height adjustable engagement means preferably comprise a sleeve slidably arranged on a vertical post.

A further advantage of the invention is the possibility to accurately measure the force exerted on the wipper hook. To that end a load cell is placed in the line connecting the traction means and the wipper hook.

The traction force on the wipper hook is preferably provided by a hydraulic ram having guiding means for the line.

According to the subject invention the pontoon can easily be displaced alongside the vessel of which the wipper hooks have to be tested by the provision of winch means. The cables of the winches are connected to the vessel and by paying or tensioning the cables the vessel can be moved alongside the vessel.

To prevent the pontoon from plunging during testing preferably ballast means are provided on the pontoon according to the invention.

BRIEF DESCRIPTION OF THE FIGURES

The invention will be further elucidated by reference to the accompanying drawings wherein.

DETAILED DESCRIPTION OF A PREFERRED EMBODIMENT OF THE INVENTION

Figure 1:
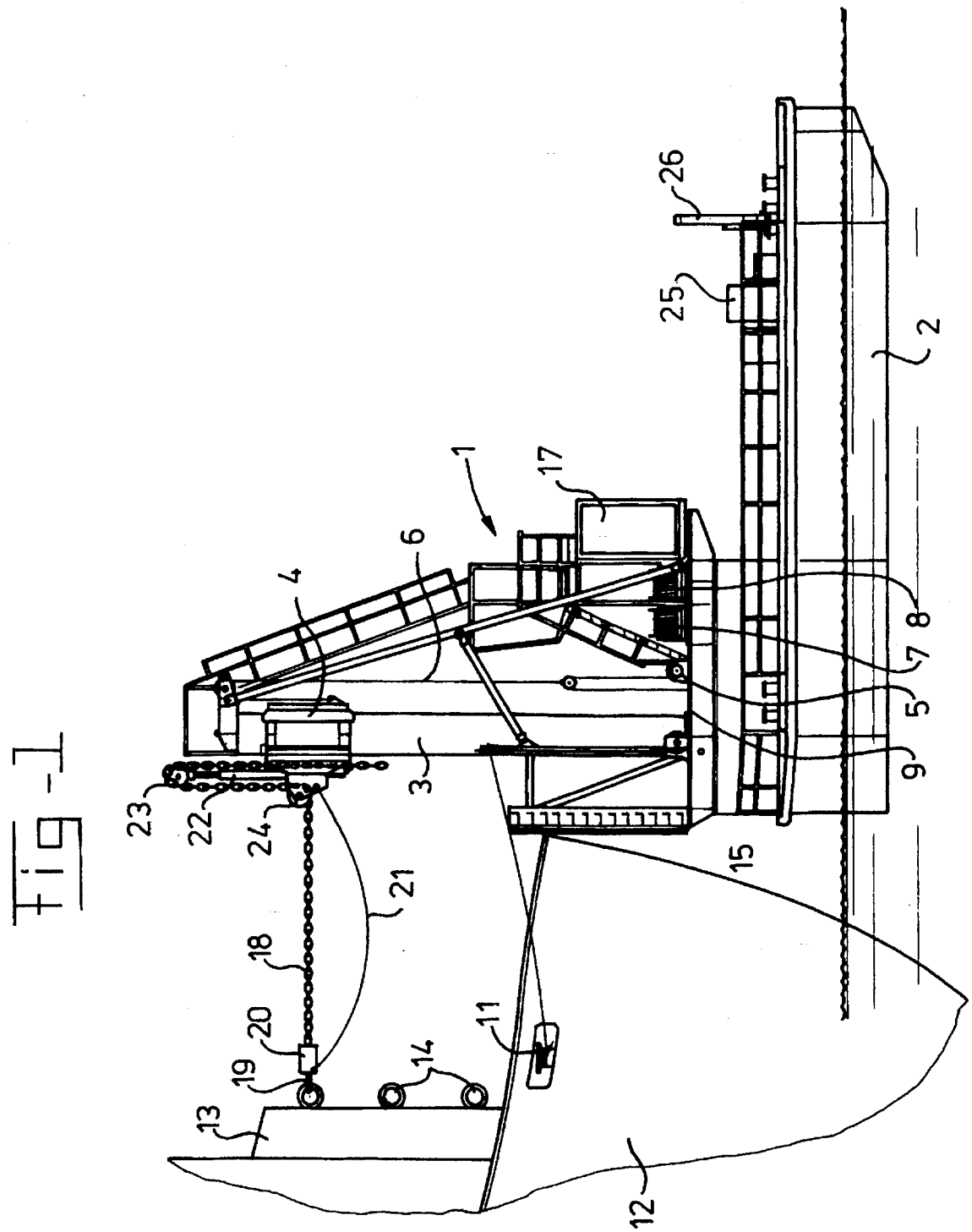
FIG. 1 shows in side view the preferred embodiment of the testing device according to the invention in combination with (a part of) a vessel of which the wipper hooks have to be tested.

In FIG. 1 the testing device according to the invention is generally referred to by 1. It comprises a vessel or pontoon 2. To pontoon 2 a vertical mast 3 is connected on which a sleeve 4 can be slid in upward and downward direction. This movement is controlled by a winch 5 which is connected to sleeve 4 through cables 6. Winches 7 and 8 are provided to control the relative position of the pontoon to the vessel. Cables 9 and 10 are connected to these winches on the one hand and connected to bollards 11 on the vessel 12 to be tested on the other hand. On this vessel 12 several masts 13 are provided with eyes 14. The integrity of eyes 14 (wipper hooks) and masts 13 has to be tested according to standardized specifications.

Pontoon 2 is furthermore provided with fender blocks 15 and 16. A control cabin 17 has all the necessary equipment to control both the movement of the pontoon as well as the detection and magnitude of the force exerted by the traction means.

These traction means comprise a chain 18 on the one hand connected through a chain stopper with sleeve 4 and on the other hand having a hook 19 to engage an eye 14. In chain 18 a load cell 20 is accommodated to obtain the most accurate information about the force exerted near hook 19. The related data are transferred through line 21. Sleeve 4 comprises a hydraulic ram 22 having a pulley 23 on its piston part. Another pulley 24 is provided to guide chain 18. By outward displacement of ram 22 the length of the chain 18 in horizontal direction is shortened.

Figure 2:
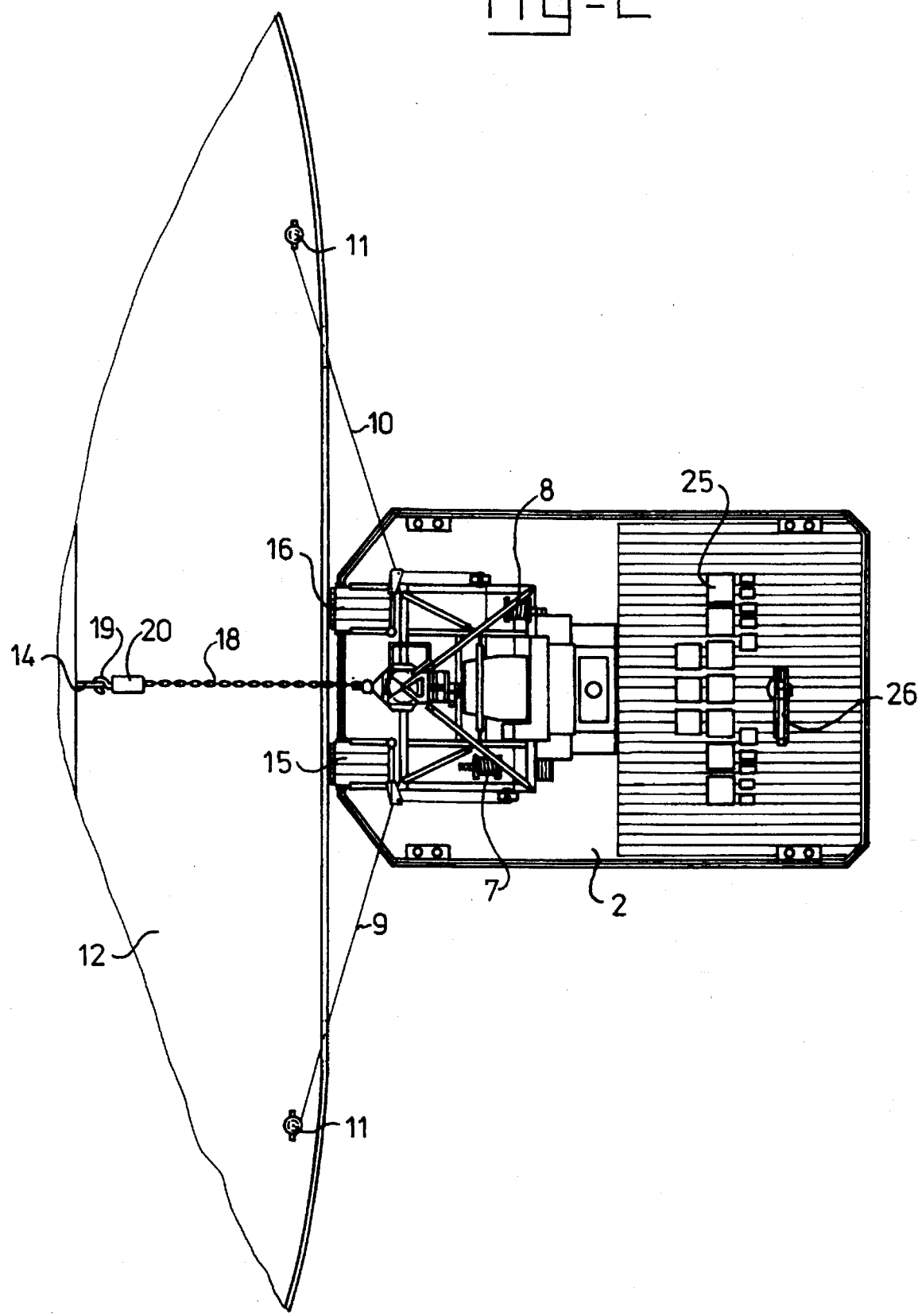
FIG. 2 shows a device according to FIG. 1 in plan view.

From FIG. 2 it is clear that ballast weights 25 are provided on the deck of pontoon 2. Together with crane 26 these ballast weights could be used for testing davits on the vessel to be tested.

The device described above functions as follows. The pontoon 2 is moored against the vessel 12 and accurately positioned with regard to eye 14 to be tested by maneuvering winches 7 and 8 and thus cables 9,10. Both winches 7 and 8 are hydraulically operated in a so-called tensioning system. After the correct position of the pontoon relative to the eyelet to be tested is obtained, the correct height of chain 18 is adjusted.

Figure 4:
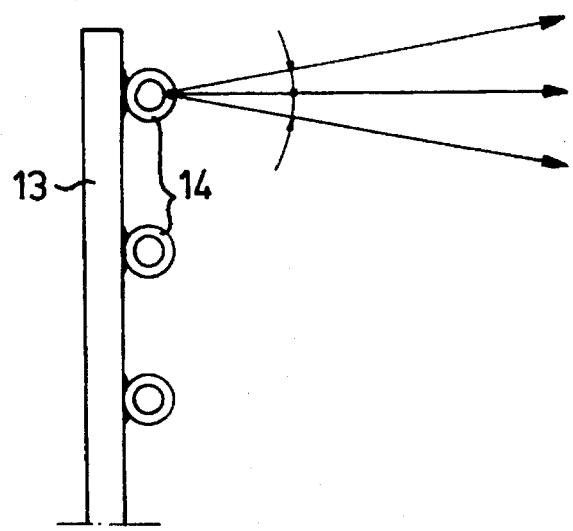
FIG. 4 shows in different directions of testing the wipper hook in height direction.

It is clear from FIG. 4 that several angular positions are prescribed in which eye 14 has to be tested. These positions are realized by moving sleeve 4 more or less upwardly through operation of winch 5.

All these operations are controlled from cabin 17. After connection of hook 19 to eye 14 through control of ram 22 a determined force can be generated at hook 19. The magnitude of this force is also displayed in operator cabin 17.

It is also possible to have this system completely automatized. This means that at the moment of connecting hook 19 to eye 4 the number or other identification of eye 14 is introduced in a computer after which the testing sequence is automatically realized and a test certificate is automatically printed if the result is positive.

Figure 3:
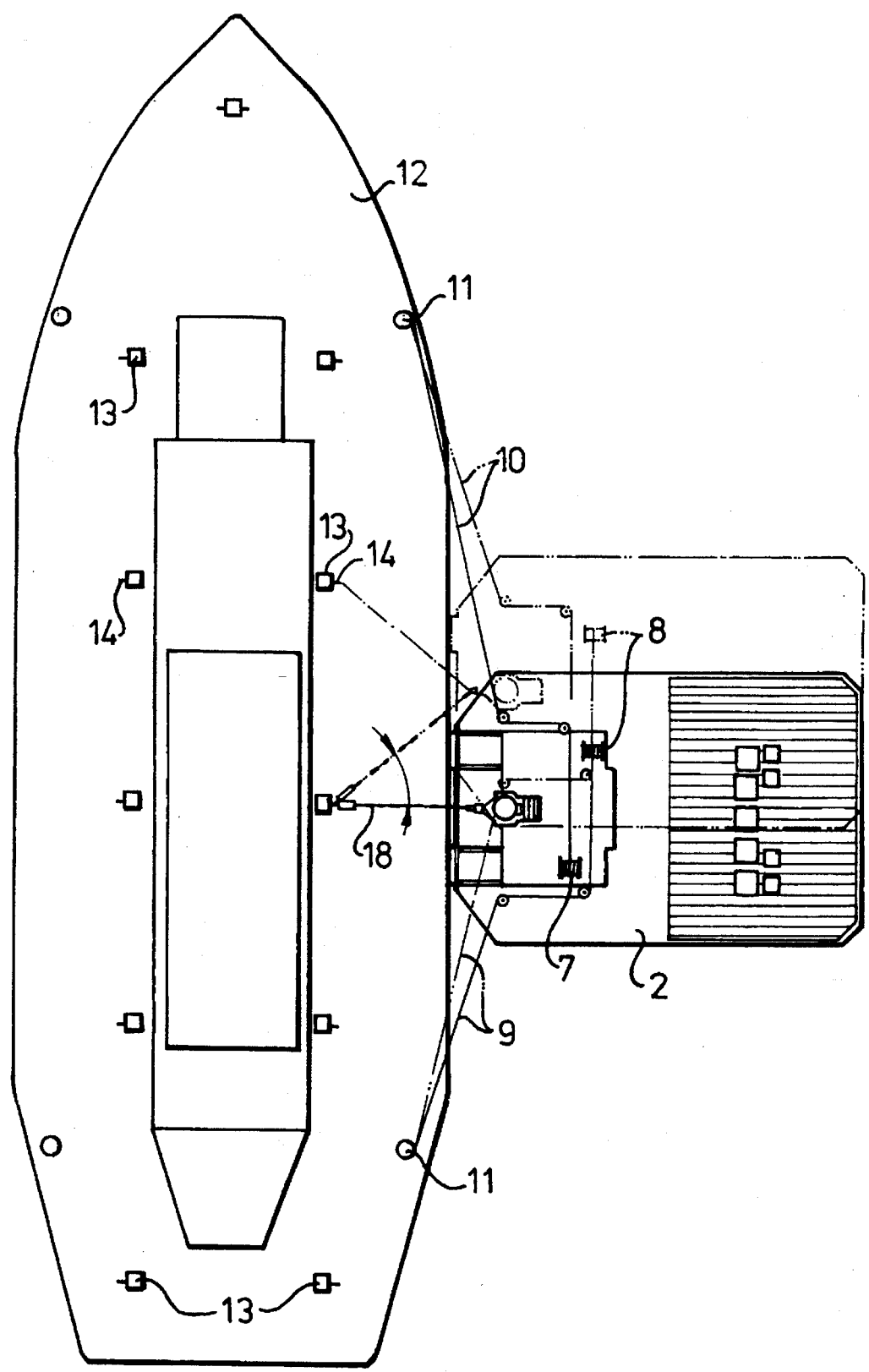
FIG. 3 shows on plan view the several positions in which the testing device can be displaced.
Figure 5:
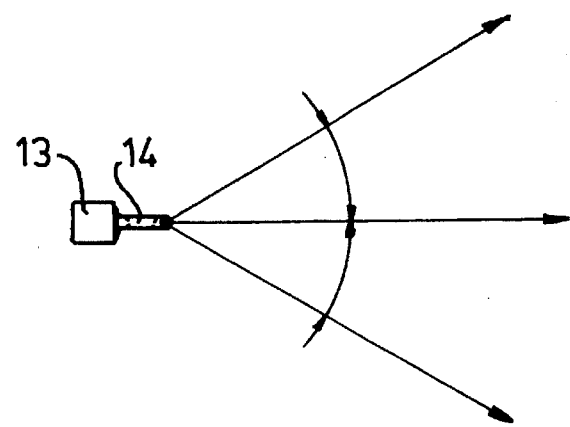
FIG. 5 shows the different positions to which the wipper hook is subjected in longitudinal direction.

From FIGS. 3 and 5 it is clear that the eyelet is also subjected to testing in several directions. It can be seen from FIG. 3 that through maneuvering of winches 7 and 8 the pontoon can easily be displaced alongside vessel 12.

As example the following values can be given to which the eyes 14 are subjected. The minimum value is about 4 tonnes whilst normally the maximum is about 20 tonnes.

Although the embodiment described above is considered to be the preferred embodiment of the invention at the time being, it is to be understood that various modifications may be made therein, and it is intended to cover in the appended claims all such modifications which fall within the true spirit and scope of the invention.

I claim:

1. A device for testing a wipper hook mounted on a mast of a vessel, comprising: a pontoon having means for positioning said pontoon against the vessel, said pontoon including traction means connected to line means, and arranged to couple with the wipper hook to be tested and exert a traction force thereon, said traction means including height adjustable coupling means mounted on the pontoon for receiving said line means, and means for determining the traction force exerted on the wipper hook.

2. A device according to claim 1, wherein the height adjustable coupling means comprise a sleeve slidably arranged on a post.

3. A device according to claim 1, wherein the line means include a load cell.

4. A device according to claim 1, wherein the traction means further include a ram having means for tensioning a free extremity of the line means and means for guiding the line means.

5. A device according to claim 1, wherein the pontoon further includes winch means for displacing said pontoon relative to said vessel.

6. A device according to claim 1, wherein the pontoon further includes ballast means.

* * * * *